3,377,291
THICKENED CHEMILUMINESCENT GELS BASED ON PERAMINOETHYLENES
Hilmer Ernest Winberg, Wilmington, Del., assignor to E. I. du Pont de Nemours and Company, Wilmington, Del., a corporation of Delaware
No Drawing. Original application Feb. 20, 1962, Ser. No. 174,404, now Patent No. 3,239,519, dated Mar. 8, 1966. Divided and this application Aug. 14, 1964, Ser. No. 389,809
6 Claims. (Cl. 252—188.3)

ABSTRACT OF THE DISCLOSURE

Claimed are chemiluminescent compositions, useful as light-generating markers adherent to vertical and porous surfaces, based on tetrakis(disubstituted-amino)ethylenes, e.g., tetrakis(dimethylamino)ethylene, containing a thickening agent, e.g., a hydrocarbon polymer such as polyisobutylene.

Related applications

This application is a division of my application Ser. No. 174,404, filed Feb. 20, 1962, and now U.S. Patent 3,239,519, itself a continuation-in-part of my copending application Ser. No. 91,589, filed Feb. 27, 1961, and now abandoned, which in turn was a continuation-in-part of my copending application Ser. No. 836,062, filed Aug. 26, 1959, now abandoned in favor of the continuation-in-part application thereof, Ser. No. 91,590, filed Feb. 27, 1961, and now U.S. Patent 3,239,518.

Field of the invention

This invention relates to, and has as its principal object provision of, thickened chemiluminescent gels based on tetrakis(disubstituted-amino)ethylenes.

Details of the invention

Pruett et al., J. Am. Chem. Soc., 72, 3646 (1950) prepared the first member of the series of the tetrakis(disubstituted - amino)ethylenes, i.e., tetrakis(dimethylamino)ethylene (TMAE). My above-mentioned copending application describes and claims the other related compounds to complete the series of compounds

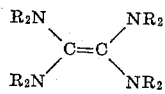

wherein the R's are selected from the group consisting of: monovalent alkyl and cycloalkyl of up to 10 carbons; in the case of two R's joined to the same N, divalent alkylene forming with the N a three- to five-membered monoaza heterocycle; and, in the case of two R's joined to different N's, divalent alkylene forming with the two N's a three- to seven-membered diaza heterocycle.

In accordance with the present invention, it has been found that useful chemiluminescent gels can be readily formed from the above-identified series of compounds merely by mixing them with at least 1% and generally no more than 50% by weight of the aminoethylene of a compatible, nonquenching, organic or inorganic thickening agent. If desired, from 10 to 90% by weight of the over-all composition of an inert nonquenching solvent can also be added to control the ultimate viscosity of the chemiluminescent gel.

The useful nonquenching thickening agents for forming the present chemiluminescent gels include nonreducible, noncoordinating inorganic oxides, preferably in colloidal dispersion, such as silica, alumina, zinc oxide, and the like; organic nonquenching polymers such as the hydrocarbon polymers, e.g., polyisobutylene, polypropylene, polyethylene, and the like; nonquenching polyesters, e.g., polyvinyl acetate and the like; nonquenching polyethers such as polytetramethylene oxide and the like; nonquenching olefin/ester copolymers such as the ethylene/vinyl acetate copolymers and the like.

Useful nonquenching solvents which may be incorporated, if desired, into the present chemiluminescent gels as viscosity control agents include the hydrocarbons such as n-hexane, decane, decalin, triisobutylene, cetane, tetraisobutylene, n-octadecane, 1-octadecene, purified kerosenes, white gasolines, or the more viscous hydrocarbons such as mineral oil and the like; nonquenching, preferably essentially hydrocarbon esters such as ethyl acetate and peanut oil; nonquenching hydrocarbon ketones such as acetone; nonquenching hydrocarbon ethers such as tetrahydrofuran, diethyl ether, dimethyl ether, and the like.

The following nonlimiting examples in which the parts given are by weight are submitted to illustrate the chemiluminescent thickened gels of this invention.

EXAMPLE 1

A mixture of tetrakis(dimethylamino)ethylene (TMAE) and 10% by weight thereof of a commercially available pyrogenic particulate silica (99.0–99.7% $SiO_2$) of particle size range 0.020–0.007 micron was stirred in a nitrogen atmosphere for two hours at room temperature and then permitted to stand overnight. The resulting thick, stable gel luminesced brightly on exposure to air.

EXAMPLE 2

A mixture of 8.6 parts of n-hexane, 8.6 parts of TMAE, and 1.7 parts of the above commercial silica was stirred under a nitrogen atmosphere for several hours. The resulting thickened composition luminesced brightly when spread on paper or metal surfaces and exposed to air.

EXAMPLE 3

A mixture of 4.8 parts of 1,1',3,3'-tetraethyl-$\Delta^{2,2'}$-bi(imidazolidine) (Example XI of my copending application Ser. No. 174,404), 4.8 parts of cyclohexane, and 0.96 part (9% by weight) of the above commercially available silica was stirred under nitrogen until a thick gel was formed. The resulting gel luminesced brightly on exposure to air. Only traces of air were required to cause the luminescence.

EXAMPLE 4

Under nitrogen a mixture of 23.2 parts of TMAE and 1.72 parts (7% by weight) of the above-mentioned commercially available silica was stirred until the viscosity no longer increased. The resulting composition, which had the consistency of light Vaseline, luminesced on exposure to air. The composition possessed sufficient viscosity so that it did not run off a vertical surface but remained where it was spread and luminesced there when exposed to air.

EXAMPLE 5

A mixture of 14.2 parts of 1,1',3,3'-tetraethyl-$\Delta^{2,2'}$-bi(imidazolidine), 14.2 parts of cyclohexane, and 1.92 parts (6.3% by weight) of the above-mentioned commercially available silica was stirred under nitrogen to give a composition having the consistency of light Vaseline. The composition luminesced on exposure to air.

EXAMPLE 6

A mixture of 8.6 parts of TMAE and 0.26 part (3% by weight) of polyisobutylene ("Vistanex" L120®) was stirred under nitrogen and heated at 100° C. for three hours. The polymer dissolved to give a solution which on cooling to room temperature had the viscosity of glycerine. This composition luminesced strongly on exposure to air.

EXAMPLE 7

A thick, clear, homogeneous solution of 10 parts of polyisobutylene ("Vistanex" L120®) in 100 parts of cyclohexane was prepared by stirring the mixture under reflux until solution was complete. To 25 parts of this solution under nitrogen was added 25 parts of TMAE. This was stirred to give a clear solution of viscosity similar to that of glycerine. The final composition, which comprised 50% TMAE, 45.5% cyclohexane, and 4.5% polyisobutylene by weight, luminesced brightly on exposure to air.

EXAMPLE 8

A homogeneous solution of 10 parts of polyisobutylene ("Vistanex" L120®) in 100 parts of cyclohexane was prepared as given in Example 7. To 30 parts of this solution under nitrogen was added 30 parts of 1,1′,3,3′-tetraethyl-Δ²,²′-bi(imidazolidine) and the mixture was stirred to give a clear solution of glycerine-like viscosity. The composition chemiluminesced brightly on exposure to air. Its final composition was approximately 4.5% polyisobutylene, 45.5% cyclohexane, and 50% 1,1′,3,3′-tetraethyl-Δ²,²′-bi(imidazolidine).

Whereas the examples above disclose the use of only two of the compounds of the useful series, others can be employed alone or in admixture merely by substituting them for or adding them to the compounds shown. Additional useful chemiluminescent compounds include tetrakis(N-pyrrolidinyl)ethylene, 1,1′,3,3′-tetra-N-butyl-Δ² ²′-bi(imidazolidine), 1,1′3,3′-tetra-N-hexyl-Δ²,²′-bi(imidazolidine), 1,1′,3,3′-tetramethyl-Δ²,²′-bi(hexahydropyrimidine), and the like.

The thickened chemiluminescent gels of the present invention are particularly useful in that they permit application of the chemiluminescent tetrakis(dihydrocarbylamino)ethylenes to surfaces where the physical nature of the luminescent aminoethylene would not permit efficient, and in some instances any, use. Thus, the liquid chemiluminescent aminoethylenes, if applied per se to vertical surfaces, would have extremely inefficient chemiluminescent periods since they obviously would flow from the applied surfaces where luminescent action was desired. Furthermore, no patterned chemiluminescent signals would be possible. On the other hand, the thickened gel compositions of the present invention can easily be applied to such surfaces wherein, by nature of their controlled high viscosities, they remain on the applied portions and furnish chemiluminescence in the desired areas for effectively long times.

These thickened chemiluminescent gels, by virtue of the controllable degree of thickness achieved therein through variations in the relative concentrations of the thickening agents, afford means for simply and effectively controlling the rate of oxidation of the tetrakis(dihydrocarbylamino)ethylenes and thereby also controlling both the rate and the intensity of the chemiluminescence. It is not known whether this rate-controlling action functions through control of the transpiration of the necessary oxygen into the thickened gels or by control of the rate of exudation of the aminoethylenes to the surface. In any event, whether the control functions through one or both of the just-described mechanisms, the control on the rate and intensity of the luminescence is fundamental, varying with decreased intensity and increased time of the luminescence as the viscosity of the thickened gels increases.

Still another important property exhibited by the thickened chemiluminescent gels of the present invention is their capability of being applied to a wide variety of surfaces while still maintaining the desired chemiluminescence. Without the thickened gels the chemiluminescent aminoethylenes, when applied to highly porous surfaces, are relatively inefficient in both the intensity and time of the chemiluminescence. Thus, when the chemiluminescent aminoethylenes, especially the liquid ones, are applied to such relatively porous surfaces as cloth, e.g., boat sails, parachutes, life jackets and the like, even in the horizontal position, the aminoethylene species are rapidly absorbed into the interior of the substrate. Accordingly, while in all probability they are still absorbing oxygen and chemiluminescing, the chemiluminescence is not visible on the applied surfaces and the desired use function has disappeared. The same equally well applies to instances of application to ground cover such as the earth, and in particular to the more highly porous forms thereof, e.g., sand as found on most oceanic beaches, in which places in times of emergency efficient chemiluminescence would be needed. The thickened chemiluminescent gels of the present invention do not become so internally absorbed and thus effectively markedly increase the light-generating efficiency of the tetrakis(dihydrocarbylamino)ethylenes on such substrates and render possible their use as chemiluminescent marking or signalling materials in much broader and more versatile fields.

Since obvious modifications and equivalents in the present invention will be evident to those skilled in the chemical arts, I propose to be bound solely by the appended claims.

What is claimed is:
1. A gel, chemiluminescent in air, consisting essentially of:
    (1) about 1–50% by weight of a compatible, nonquenching thickening agent selected from the group consisting of hydrocarbon polymers; polyesters; polyethers; and olefin/ester copolymers; and
    (2) at least one tetrakis(disubstitutedamino)ethylene of the formula

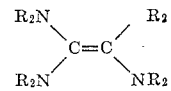

wherein the R's are selected from the group consisting of monovalent alkyl and cycloalkyl of up to 10 carbons; in the case of two R's joined to the same N, divalent alkylene forming with the N a 3- to 5-membered monoaza heterocycle; and, in the case of two R's joined to different N's, divalent alkylene forming with the two N's a three- to seven-membered diaza heterocycle.

2. A gel of claim 1 containing additionally a nonquenching solvent.

3. A gel of claim 2 in which the tetrakis(disubstitutedamino)ethylene is tetrakis(dimethylamino)ethylene.

4. A gel of claim 1 in which the thickening agent is polyisobutylene.

5. A gel of claim 4 in which the tetrakis(disubstitutedamino)ethylene is tetrakis(dimethylamino)ethylene.

6. A gel of claim 4 in which the tetrakis(disubstitutedamino)ethylene is 1,1′,3,3′ - tetraethyl - Δ²,²′-bi(imidazolidine).

References Cited

UNITED STATES PATENTS 2,935,481   5/1960   Hochwalt _____ 252—301.3
3,116,187   12/1963  Scanlon et al. _____ 149—36 XR

OTHER REFERENCES

De Mente, J. A., Fluorochemistry Chemical Publishing Co., New York (1945), pp. 624–630.
Pruett et al., J. Am. Chem. Soc. 72, p. 3646 (1950).

MURRAY KATZ, *Primary Examiner.*

LEON D. ROSDOL, BENJAMIN R. PADGETT,
*Examiners.*

J. D. WELSH, L. A. SEBASTIAN, *Assistant Examiners.*

UNITED STATES PATENT OFFICE
CERTIFICATE OF CORRECTION

Patent NO. 3,377,291            April 9, 1968

Hilmer Ernest Winberg

It is certified that error appears in the above identified patent and that said Letters Patent are hereby corrected as shown below:

Column 4, line 35, the upper right-hand portion of the formula reading $R_2$         should read         $NR_2$ Signed and sealed this 26th day of August 1969.

(SEAL)
Attest:

Edward M. Fletcher, Jr.            WILLIAM E. SCHUYLER, JR.

Attesting Officer                     Commissioner of Patents